US010129355B2

(12) United States Patent
Venkatraman et al.

(10) Patent No.: US 10,129,355 B2
(45) Date of Patent: Nov. 13, 2018

(54) ADAPTIVE CONTENT OPTIMIZATION

(71) Applicant: Affirmed Networks, Inc., Acton, MA (US)

(72) Inventors: Srinivasan Venkatraman, Belmont, MA (US); Piotr Galecki, Lexington, MA (US); Thuy Fernandes, Acton, MA (US); Paul Alexander, Lexington, MA (US); John Sievers, Lynnfield, MA (US)

(73) Assignee: AFFIRMED NETWORKS, INC., Acton, MA (US)

( * ) Notice: Subject to any disclaimer, the term of this patent is extended or adjusted under 35 U.S.C. 154(b) by 0 days.

(21) Appl. No.: 15/789,471

(22) Filed: Oct. 20, 2017

(65) Prior Publication Data

US 2018/0115626 A1 Apr. 26, 2018

Related U.S. Application Data

(60) Provisional application No. 62/410,929, filed on Oct. 21, 2016.

(51) Int. Cl.
*G06F 15/167* (2006.01)
*H04L 29/08* (2006.01)
(Continued)

(52) U.S. Cl.
CPC ...... *H04L 67/2828* (2013.01); *H04L 43/0876* (2013.01); *H04L 43/16* (2013.01);
(Continued)

(58) Field of Classification Search
CPC .............................. H04L 47/215; H04L 47/22
See application file for complete search history.

(56) References Cited

U.S. PATENT DOCUMENTS

| 2003/0061369 | A1 | 3/2003 | Aksu et al. |
| 2009/0055534 | A1* | 2/2009 | Sadja .................. G06F 8/65 709/226 |

(Continued)

OTHER PUBLICATIONS

International Search Report and Written Opinion issued by the U.S. Patent and Trademark Office as International Searching Authority, issued in International Application No. PCT/US17/36763, dated Aug. 29, 2017 (10 pages).

(Continued)

*Primary Examiner* — Aftab N. Khan
(74) *Attorney, Agent, or Firm* — Wilmer Cutler Pickering Hale and Dorr LLP (57) ABSTRACT

Systems and methods are described herein for adaptively transcoding media in a communications network such that computer processing resources are effectively utilized to deal with varying traffic patterns in the communications network. A computing device receives a request to transcode content and determines a first amount of tokens based on a number of CPU cores associated with the computing device, and a currently used amount of tokens. The computing device determines a second amount of tokens associated with transcoding the content and when the first amount of tokens is less than the second amount of tokens, the computing device bypasses transcoding for the content or adjusts a transcoding parameter to reduce a number of tokens associated with transcoding the content.

18 Claims, 5 Drawing Sheets

(51) Int. Cl.
*H04L 12/815* (2013.01)
*H04L 12/819* (2013.01)
*H04L 12/26* (2006.01)

(52) U.S. Cl.
CPC ............ *H04L 47/215* (2013.01); *H04L 47/22* (2013.01); *H04L 43/0882* (2013.01)

(56) References Cited

U.S. PATENT DOCUMENTS

| | | | |
|---|---|---|---|
| 2009/0232220 A1 | 9/2009 | Neff et al. | |
| 2009/0254672 A1* | 10/2009 | Zhang | H04N 21/23106 709/231 |
| 2010/0017516 A1* | 1/2010 | Sparrell | H04N 21/23106 709/226 |
| 2010/0115575 A1* | 5/2010 | Yu | H04N 7/17318 725/142 |
| 2010/0322071 A1* | 12/2010 | Avdanin | H04L 43/0894 370/230 |
| 2011/0292792 A1* | 12/2011 | Zuo | H04L 47/20 370/230 |
| 2013/0117418 A1 | 5/2013 | Mutton et al. | |
| 2013/0173849 A1* | 7/2013 | Balakrishnan | G06F 3/0613 711/103 |
| 2014/0304303 A1 | 10/2014 | Dalal et al. | |

OTHER PUBLICATIONS

Schwarz, H. et al., "Analysis of Hierarchical B Pictures and MCTF", IEEE Int'l Conf. Multimedia and Expo, ICME, Jul. 2006, pp. 1929-1932 (4 pages).

International Search Report and Written Opinion issued by the U.S. Patent and Trademark Office as International Searching Authority in International Application No. PCT/US17/57622, dated Dec. 26, 2017 (10 pages).

* cited by examiner

ADAPTIVE CONTENT OPTIMIZATION

CROSS REFERENCE TO RELATED APPLICATIONS

This application claims priority to U.S. Provisional Application No. 62/410,929, filed on Oct. 21, 2016, which is incorporated herein by reference.

TECHNICAL FIELD

Embodiments of the present invention generally relate to content delivery in a mobile network.

BACKGROUND

In a mobile network with rapidly changing traffic patterns, traditional hardware solutions are often unable to effectively deal with a worst case traffic pattern. If the hardware required for the worst case is significantly large it results in operators buying a large number of servers which are not used effectively most of the time. If the number of servers are small, the optimization solution can get overloaded (e.g., in terms of CPU and memory) when there is a sudden spike in optimizable heavy content (e.g., images and video).

SUMMARY OF THE INVENTION

Systems and methods are described herein for adaptively transcoding media in a communications network such that computer processing resources are effectively utilized to deal with varying traffic patterns in the communications network. In some embodiments, a computing device receives a request to transcode content for delivery from a content provider to an end user device. In some embodiments, the computing device determines a first amount of tokens based on: a pooled amount of tokens associated with a number of CPU cores associated with the computing device, and a currently used amount of tokens, the currently used amount of tokens being associated with a number of other transcoding requests being processed by the computing device. In some embodiments, the computing device determines a second amount of tokens associated with transcoding the content based on at least one of a size of the content, a type of the content, a resolution of the content, and a frame rate of the content. In some embodiments, when the first amount of tokens is less than the second amount of tokens, the computing device bypasses transcoding for the content, or adjusts a transcoding parameter to reduce a number of tokens associated with transcoding the content, wherein the reduced number of tokens is less than the first amount of tokens.

In some embodiments, the computing device adjusts the pooled amount of tokens based on at least one of: a level of CPU usage associated with the computing device, and an amount of available channel bandwidth. In some embodiments, the currently used amount of tokens ranges from zero tokens to the pooled amount of tokens. In some embodiments, determining the first amount of tokens further comprises subtracting the currently used amount of tokens from the pooled amount of tokens. In some embodiments, the computing device transcodes the requested content when the first amount of tokens is greater than or equal to the second amount of tokens. In some embodiments, the type of the content comprises at least one of image, audio, text, and video. In some embodiments, the computing device determines the number of CPU cores based on a number of virtual machines provisioned to transcode the content. In some embodiments, adjusting the transcoding parameter includes reducing an amount of transcoding applied to the content.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

System and methods are described herein for providing a virtualized environment for content optimization where the number of tokens across virtual machines (VM) can scale in and scale out. Optimization parameters for a transcoding job can be determined based on the available resources. In some embodiments, the adaptive optimization techniques described herein are implemented in an HTTP Proxy. The dynamic decisions described herein regarding optimization allow for the effective use of resources and optimal bandwidth savings.

Figure 1:
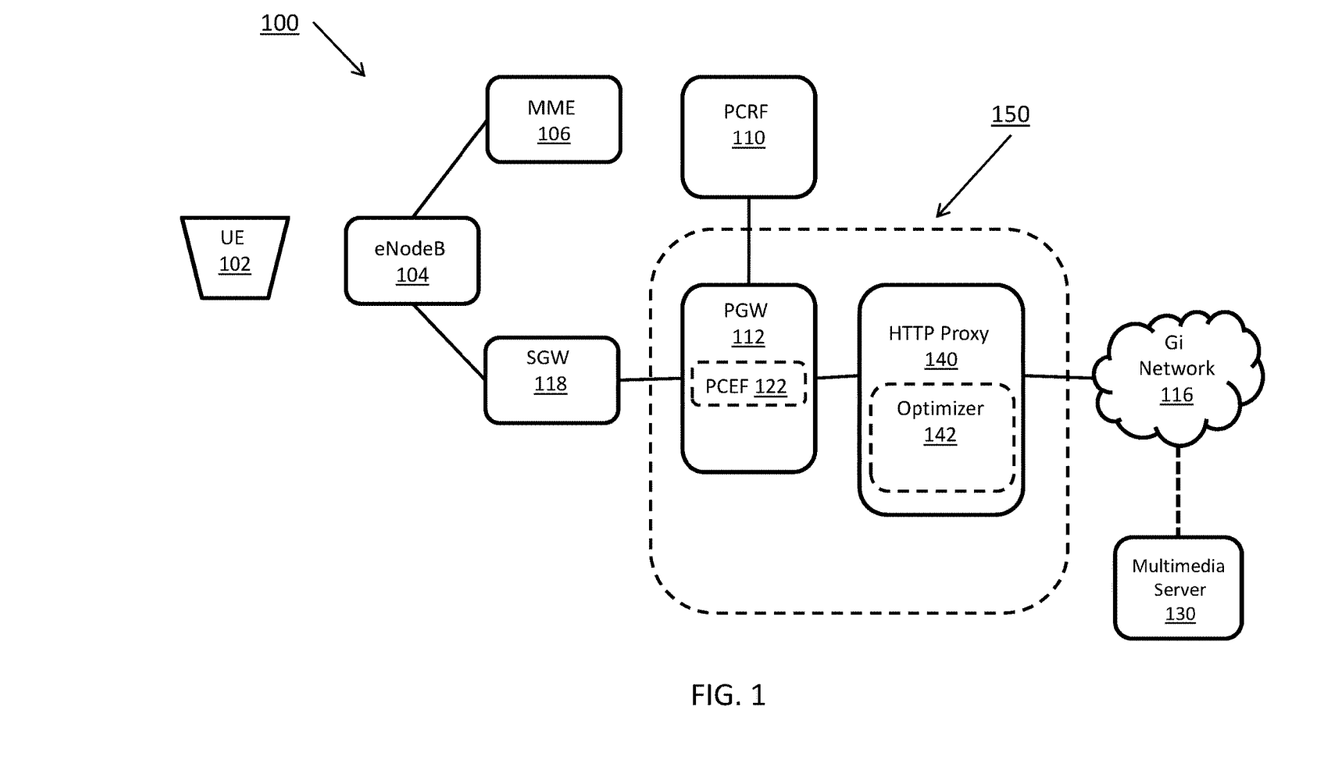
FIG. 1 is a system diagram showing a networked system 100, according to some embodiments of the present disclosure.

FIG. 1 is a system diagram showing a networked system 100, according to some embodiments of the present disclosure. System 100 includes user equipment (UE) 102, evolved node B (eNodeB) 104, mobility management entity (MME) 106, serving gateway (SGW) module 108, policy and charging rules function (PCRF) 110, packet data network gateway (PGW) 112, public data (Gi) network 116, policy and charging enforcement function (PCEF) 122, multimedia server 130, HTTP proxy 140, optimizer 142, and virtualization module 150.

UE 102 connects to the networked system 100 through eNodeB 104. UE 102 includes computing devices configured to connect to a mobile data network (e.g., mobile phones, tablets, laptops). eNodeB 104 is a radio part of a cell site. A single eNodeB 104 may contain several radio transmitters, receivers, control sections and power supplies. eNodeB 104 can be backhauled to MME 106 and SGW 108. Backhaul is a process of transferring packets or communication signals over relatively long distances to a separate location for processing. SGW 108 routes and forwards user data packets, while also acting as the mobility anchor for a user plane during inter-eNodeB handovers. MME 106 is a control node in the networked system 100. MME 106 handles the LTE related control plane signaling that also includes mobility and security functions for UE 102 that attaches to the LTE Radio network. MME 106 also handles UE being in idle mode, including support for Tracking area management and paging procedures.

When a UE 102 attaches to the network, multiple control messages are exchanged between network elements in order to create a data session (e.g., a 4G session) and provide data connectivity to the UE 102. As explained above, eNodeB 104 can be backhauled to MME 106 and SGW 108. SGW 108 routes and forwards user packets to PGW 112. PGW 112 can act as a Policy Enforcement Point (PEP). PGW 112 communicates with PCRF 110, which can download policy information that is specific to a subscriber. PCRF acts as a Policy Decision Point (PDP).

PGW 112 includes PCEF 122. PCEF 122 enforces policy decisions received from PCRF 110 and provides policy enforcement as well as charging functionalities.

PGW 112 also provides UE 102 with connections to external packet data networks through Gi Network 116. As described in more detail below, UE can request and receive video from a multimedia server 130.

Situated between PGW 112 and a network 116 can include HTTP proxy 140. HTTP proxy 140 routes HTTP requests from the client to network 116. HTTP proxy 140 can include optimizer 142. Optimizer 142 optimizes multimedia (e.g., video, image, audio, text) by allocating bandwidth to the multimedia based on characteristics of the multimedia, such as size, type and rate.

Virtualization module 150 refers to a virtualized representation of PGW 112, PCEF 122, HTTP proxy 140 and optimizer 142. The functions of PGW 112, PCEF 122, HTTP proxy 140 and optimizer 142 can be implemented on virtual machines or in the cloud. In some embodiments, virtualization module 150 can include a subset of PGW 112, PCEF 122, HTTP proxy 140 and optimizer 142. As described in more detail below, virtualization module 150 can be used to deploy PGW 112, PCEF 122, HTTP proxy 140 and optimizer 142 as virtual machine (VM) clusters.

Figure 2:
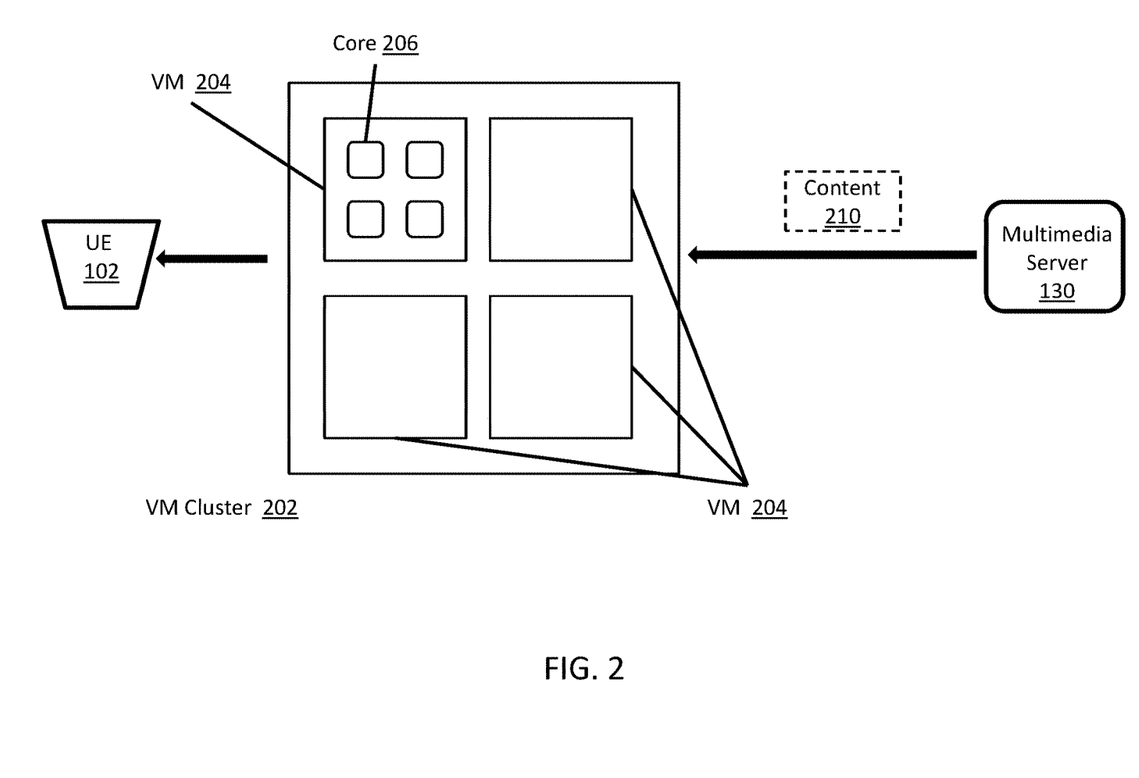
FIG. 2 is a system diagram showing content being delivered via a cluster, according to some embodiments of the present disclosure.

FIG. 2 is a system diagram showing content being delivered via a cluster, according to some embodiments of the present disclosure. FIG. 2 shows UE 102, multimedia server 130, cluster 202, virtual machine (VM) 204, core 206, and content 210.

A cluster 202 refers to a collection of virtual machines (VMs). A cluster 202 is usually associated with one deployment. A deployment refers to a physical setup of computers and processors hosting the cluster. A deployment is usually associated with a particular network and can be related to a geographic area. In some embodiments, a cluster 202 serves a particular geographic region. While specific examples of hardware architecture are described, the techniques described herein are independent of any specific hardware architecture.

In some embodiments, a virtual machine 204 can also include containers. A container is virtualization method for running multiple isolated systems on a single host (e.g., Docker or Linux container).

As described above, a cluster 202 can contain multiple virtual machines 204. Each virtual machine is usually associated with one server. Virtual machines can span multiple processors on a server or multiple virtual machines can be associated with a single processor. In some embodiments, the correspondence between a virtual machine and a processor is one to one. Virtual machines 204 virtualize the PGW 112, PCEF 122, HTTP proxy 140 and optimizer 142 described with respect to FIG. 1. Each of PGW 112, PCEF 122, HTTP proxy 140 and optimizer 142 can run on separate virtual machines or combinations of the modules can run on a single virtual machine. For example, HTTP proxy 140 and optimizer 142 may run on one virtual machine. A cluster can contain multiple instances of each of PGW 112, PCEF 122, HTTP proxy 140 and optimizer 142. As explained in more detail below, virtual machine 204 can also include a management engine to manage the other VMs.

Each virtual machine 204 also utilizes a number of processor cores 206. Generally, a central processor unit (CPU) contains a number of processor cores. A virtual machine is associated with a number of processor cores based on the portion of a CPU or a number of CPUs that a virtual machine is associated with. For example, if a virtual machine is mapped to a single CPU, and the CPU contains 8 cores, the virtual machine would utilize 8 cores.

Content 210 can be image (e.g., jpg, gif, png) video (e.g., mp4, fly, webm), audio (e.g., mpeg, way, mp3, aac), or text (e.g., html, javascript, css). Content can be associated with a size, resolution, or quality. As described in more detail below, the size, resolution, or quality of the content can be associated with a number tokens.

In some embodiments, one of the VMs 204 is a management engine, as described in more detail below.

Figure 3:
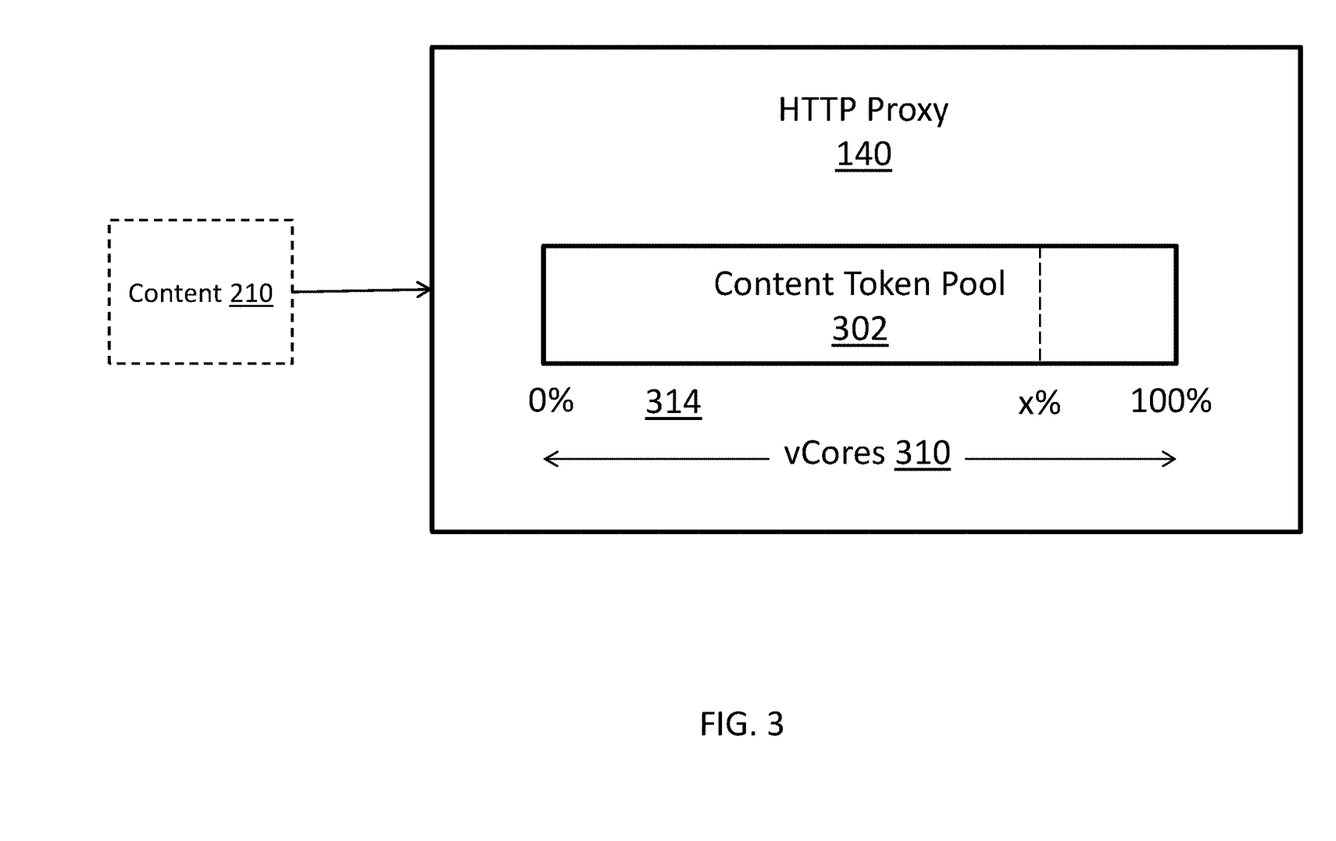
FIG. 3 is a diagram showing content tokens, according to some embodiments of the present disclosure.

FIG. 3 is a diagram showing a content token pool, according to some embodiments of the present disclosure. FIG. 3 shows HTTP proxy 140, content 210, a content token pool 302, virtual machine cores (vCores) 310, and percentage of tokens available 314.

In some embodiments, HTTP Proxy 140 includes a content token pool 302. Content tokens 302 can be used to represent an amount of virtual machine resources available for processing multimedia content 210. An amount of virtual machine resources is related to an amount of CPU resources, or CPU cores, utilized by the virtual machines 310. For example, assuming that each core is assigned 10 tokens, and that a virtual machine running HTTP proxy 140 is mapped to 8 cores, then the number of tokens assigned HTTP proxy 140 would be 80 tokens.

In some embodiments, the number of content tokens assigned an HTTP proxy 140 can further depend on a percentage of CPU usage considered normal and acceptable for steady state operation. For example, a level of 70% CPU usage might be considered a normal amount, a level of 80% CPU usage a moderate amount, a level of 90% CPU usage a major amount, and a level of 100% CPU usage a critical amount. In some embodiments, a normal amount of CPU usage is associated with an amount of CPU usage, or loading, that can handle occasional peaks or spikes of higher CPU usage and will not overload the system. Moderate CPU usage is associated with an amount of CPU usage that requires close monitoring of the operation and performance of the CPU to ensure normal CPU operation. Major CPU usage can result in brief impacts on the system operation and performance. Critical CPU usage refers to CPU usage that impacts the operation and performance of the system.

At system startup, each VM starts in an idle state where there is a low amount of CPU usage, for example, 10%. As each VM starts taking on "work" which can be any type of processing that includes new content, CPU cycles are required for that work. With periodic monitoring, the CPU usage is evaluated and actions are taken (e.g., decrement or increment the size of the token pool). With a burst of activity (or work), the amount of CPU usage can go up to, for example, 85%. During the burst, the size of the token pool is reduced. Once the burst condition is over it is possible that CPU usage goes back to, for example, 70% (which can correspond to the normal condition described above) and the size of the token pool can be increased. By reducing the number of tokens in the pool, as described above in the burst condition example, the "workload" capacity is effectively "adjusted" which brings back the CPU load to acceptable levels.

As described above, the CPU usage thresholds can be translated into a percentage of tokens 314 available to the HTTP proxy 140. For example, taking the previous example, assuming 80 tokens is assigned to HTTP proxy 140 based on the HTTP proxy 140 being associated with 8 cores, the number of tokens assigned to the HTTP proxy 140 might be reduced to 60% or 48 tokens for major CPU loading and 70% or 56 tokens for moderate CPU loading. In general, a higher percentage of tokens are associated with moderate CPU loading than with major CPU loading, and a higher percentage of tokens are associated with major CPU loading than with critical CPU loading.

As described above, multimedia content 210 can be associated with one or more parameters, such as multimedia size, resolution, or quality. Each of size, resolution, or quality of the content can be associated with a number tokens. For example, a video clip can be assigned more tokens than an image or audio file. A large video can be assigned more tokens than a smaller video, and a higher resolution video can be assigned more tokens than a lower resolution video.

In some embodiments, HTTP proxy 140 can process a certain number and type of content 210 as the HTTP proxy 140 has an available number of tokens in its token pool. For example, assuming the HTTP proxy 140 has available 60 tokens taking into consideration a number of cores and amount of CPU usage, and a high quality video is associated with 25 tokens. In some embodiments, the tokens are assigned to each process by a management process/component running on the management VM. If only receiving requests for high quality videos, the HTTP proxy 140 can only process two videos (i.e., 25+25 tokens=50 tokens worth of video). Processing as referred to herein can also refer to multimedia optimization (e.g., compression, transrating, transcoding, using adaptive bitrate techniques). In some embodiments, the optimization is performed by optimizer 142. While transcoding can be one form of optimization, transcoding and optimization are used interchangeably herein. Transcoding, as used herein, can also refer to compression, transrating and other bitrate reduction techniques.

HTTP proxy 140 as shown in FIG. 3 can be one of many HTTP proxies in a cluster. In some embodiments, a management engine (not shown in FIG. 3) monitors all instances of HTTP proxies. The management engine can be a virtual machine that manages all of the VMs in the cluster and can also manage the HTTP proxies. Assuming that all HTTP proxies in a cluster are at capacity (i.e., each HTTP proxy in the cluster has used a maximum amount of tokens given the types of content), management engine can: 1) send CPU usage information or CPU overload information (e.g., normal, moderate, major, critical) to one or more of the HTTP proxies, and in response, the HTTP proxies can provide less optimization for the content (e.g., providing less compression), which uses less tokens; 2) send CPU usage information or CPU overload information (e.g., normal, moderate, major, critical) to one or more of the HTTP proxies, and in response, the one or more of the HTTP proxies skips optimization. In some embodiments, a load balancing engine (which can be on a virtual machine, for example on a PCEF VM if the PCEF is also virtualized) schedules subsequent operations such that a least loaded virtual machine is selected to process the subsequent operations.

Figure 4:
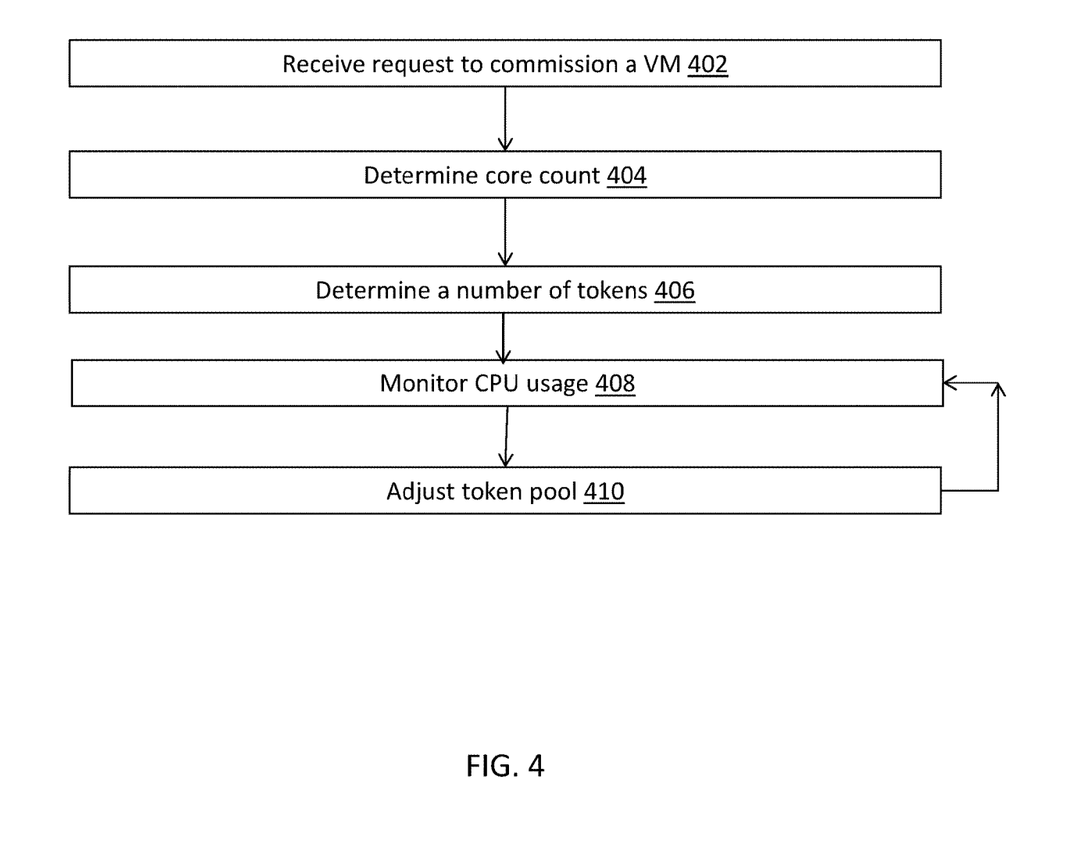
FIG. 4 is a flowchart showing the process for adjusting a token pool, according to some embodiments of the present disclosure.

FIG. 4 is a flowchart showing the process for adjusting the token pool size, according to some embodiments of the present disclosure.

Referring to step 402, a request is received to provision virtual machines for optimizing multimedia content in a telecommunications network. As described above, the request can be associated with provisioning a virtual machine for each element in the virtualization module 150, as described above with respect to FIG. 1. The request can originate from a network operator (e.g., AT&T, Verizon, T-Mobile).

Referring to step 404, a core count is determined for each virtual machine. As described above, a virtual machine is usually assigned to one more CPUs, each of which can be further associated with a number of CPU cores. In some embodiments, each VM is assigned a particular number of cores based on the type of VM (e.g Proxy VM, PCEF VM, Management VM).

Referring to step 406, an initial number of tokens for each virtual machine is determined based on the number of cores assigned to the virtual machine. As described above, assuming a virtual machine running HTTP proxy 140 is associated with 8 cores, and each core is assigned 10 tokens, then the number of tokens associated with the virtual machine running HTTP proxy 140 is 80 tokens.

Referring to step 408, CPU usage is monitored to determine a CPU usage level. As described above, CPU usage level can be normal, moderate, major, or critical. In some embodiments, CPU usage is affected by the amount of work the process has to do in the VM. Generally, the more the processing, the more the CPU cycles utilized. Consequently, more optimization work (e.g., transcoding, image optimization) takes more CPU cycles, and increases the overall CPU percentage.

Referring to step 410, the token pool can be continuously adjusted based on the CPU usage monitoring. As described above, a monitored CPU usage level can be translated into an adjustment in the size of the token pool. In some embodiments, the token pool can also be adjusted based on an amount of available channel bandwidth. Channel bandwidth can vary at different times. In some embodiments, a token pool can represent an amount of available channel bandwidth such that every transcoded video or image consumes fewer tokens and every bypassed video or image consumes a larger amount of tokens, and the available amount of channel bandwidth and size of the token pool can vary over time. An advantage of relating tokens with available channel bandwidth is that more transcoding can occur when channel bandwidth is constricted.

Figure 5:
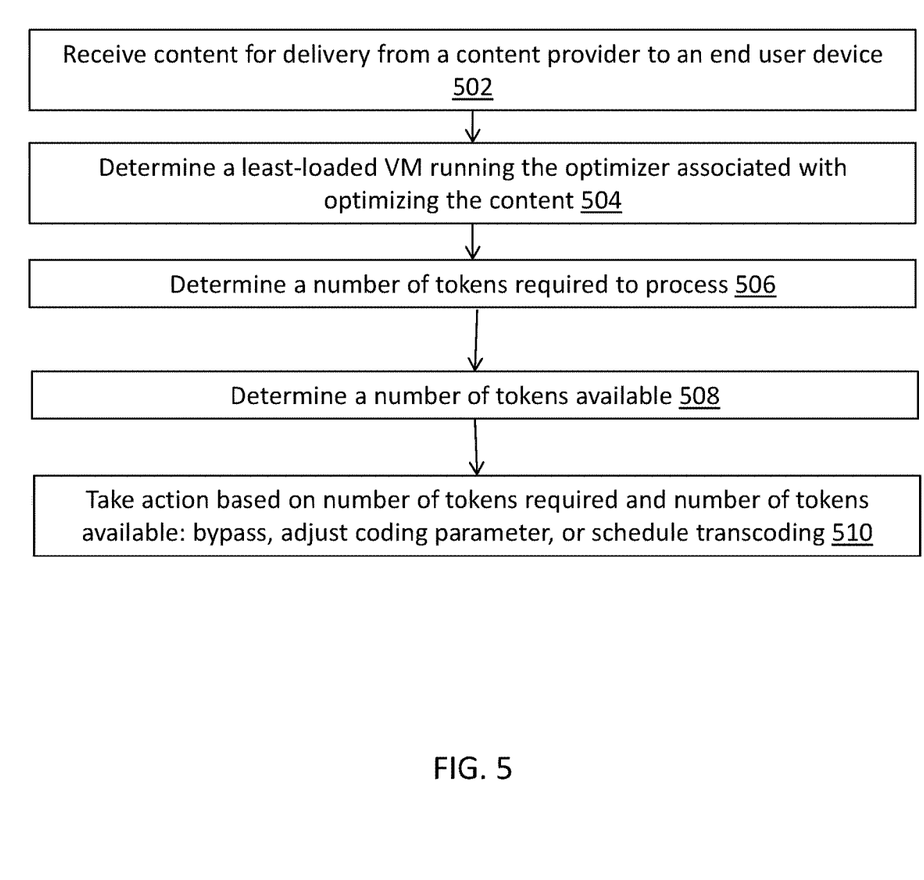
FIG. 5 is a flowchart showing an adaptive content optimization technique, according to some embodiments of the present disclosure.

FIG. 5 is a flowchart showing an adaptive content optimization technique, according to some embodiments of the present disclosure.

Referring to step 502, content is received for delivery from a content provider to an end user device. In some embodiments, the content includes images, audio, videos and html/javascript/css. Each content type can be associated with a technique to optimize (e.g., compress, transcode) the content. The optimization techniques can include html/javascript/css minification, audio and video transcoding, and image transcoding.

Referring to step 504, a least-loaded VM running an optimizer associated with optimizing the content is determined. In some embodiments, a least-loaded VM is a VM with the most CPU resources available.

Referring to step 506, a number of tokens required to process the content is determined. As described above, the number of tokens assigned to content can depend on various content parameters, such as content size, content quality and content type. In general, larger content is assigned more tokens than smaller content, higher content quality is assigned more tokens than lower content quality, and video is assigned more tokens than audio or images.

Referring to step 508, a number of tokens available is determined. The process for determining a number of tokens available is described above with respect to FIG. 4. In some embodiments, the number of initial tokens available can be associated with a number of tokens assigned to the provisioned virtual machines when no requests have been processed. In some embodiments, the number of tokens available can be associated with a number of tokens assigned to the provisioned virtual machines minus the number of tokens being used by other processes or requests. For example, if 100 tokens are assigned to a provisioned virtual machine, the available number of tokens (assuming no processes are being run) is 100 tokens. If one or more requests are being run requiring 60 tokens, then the number of available tokens is 40 tokens. As explained in more detail in FIG. 4, the number of initial tokens can also change based on CPU utilization.

Referring to step 510, an action is taken based on the number of tokens required and a number of tokens available: bypass, adjust coding parameters, or schedule transcoding. If enough tokens are available, the content is processed normally. Normal processing refers to applying a maximum amount of compression or transcoding normally associated with the content (e.g., based on its type, size, and resolution). When there are not enough tokens available, the actions can include bypass, or adjusting a processing parameter. Bypass and adjusting a processing parameter are actions that relate to reducing the amount of CPU resources required to process the content. Bypass refers to skipping processing of the content. Adjusting a processing parameter can include reducing the amount of compression or transcoding applied. In some embodiments, a parameter is adjusted such that a number of tokens required to process the content is less than the number of available tokens.

As described above, content can be assigned tokens based on size of the content (e.g., number of bytes associated with the content), type of the content (e.g., image, video), and resolution (e.g., video resolution). Table 1, below, shows an example of a number of tokens that can be assigned based on content type, subtype, size and/or resolution.

TABLE 1

| Content-type | Content subtype | Criteria: Image size/Video Resolution | Number of tokens |
|---|---|---|---|
| Image | jpeg | Large/Medium/Small | 5/3/1 |
|  | gif | Large/Medium/Small | 15/10/5 |
|  | png | Large/Medium/Small | 5/3/1 |
| Video | mp4 | UHD (2160 p)/HD(1080 p)/HD (720 p) | 100/50/25 |
|  | flv | UHD (2160 p)/HD(1080 p)/HD (720 p) | 75/40/20 |
|  | webm | UHD (2160 p)/HD(1080 p)/HD (720 p) | 75/40/20 |

As shown in Table 1, images can be assigned a fixed number of tokens based on its resolution. For example, larger content is assigned more tokens than smaller content (e.g., 5/3/1 tokens for a large/medium/small jpeg, respectively). For video, numbers of tokens are assigned based on required pixel processing rate, which combines resolution and frame rate. For example, higher content quality is assigned more tokens than lower content quality (e.g., 100/50/25 tokens for a UHD (2160p)/HD (1080p)/HD (720p) mp4, respectively), and video is assigned more tokens than audio or images (e.g., video assigned at least 4-5 number of tokens as images).

Also as described above, a determination is made as to the initial number of tokens available and how many tokens are required to process each given content type of a given size and resolution. Table 2, below, gives an example of how the number of tokens initially assigned to a token pool may vary according to what target level of CPU usage is to be designated as normal, and the number of mp4 videos and large jpegs that can be processed with the number of tokens available.

TABLE 2

| CPU target | Tokens/Proxy | MP4 Videos/Proxy | Large Jpeg/Proxy |
|---|---|---|---|
| 60% | 108 | 2 | 21 |
| 65% | 117 | 2 | 23 |
| 70% | 126 | 2 | 25 |
| 75% | 135 | 2 | 27 |

For example, at 60% CPU usage target, 108 tokens are available. mp4 videos at HD (1080p) take 50 tokens, as shown in Table 1. As such, only two mp4 videos at HD (1080p) can be processed at 60% CPU usage target. Large jpegs, in contrast, require only 5 tokens. As such, 21 jpegs can be processed at 60% CPU usage target.

Some embodiments of the present disclosure relate to systems and computerized methods of adaptively transcoding media in a mobile network using virtualized network elements such that computer processing resources are effectively utilized to deal with varying traffic patterns in the mobile network. In some embodiments, the systems and computerized methods include receiving, by a computing device, a request to commission virtual machines to virtualize mobile transcoding operations in a mobile network; assigning, by the computing device, a number of computing cores to each of the virtual machines based on: an amount of central processing unit (CPU) resources available to the virtual machines, and a function associated with each of the virtual machines; determining, by the computing device, a first amount of tokens associated with each of the virtual machines, the first amount of tokens based on: the CPU resources assigned to each of the virtual machines, and a level of CPU usage associated with each of the CPU resources; receiving, by the computing device, a request to transcode content for delivery from a content provider to an end user device; determining, by the computing device, a second amount of tokens associated with transcoding the content; and when the second amount of tokens exceeds the first amount of tokens: sending, by the computing device, an instruction to the virtual machines to: bypass transcoding for the content, or adjust a transcoding parameter to reduce an amount of transcoding applied to the content.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A computerized method of adaptively transcoding media in a communications network such that computer processing resources are effectively utilized to deal with varying traffic patterns in the communications network, the method comprising:
  receiving, by a computing device, a request to transcode content for delivery from a content provider to an end user device;
  determining, by the computing device, a number of CPU cores associated with the computing device based on at least one of a number of virtual machines and a number of containers provisioned to transcode the content;
  determining, by the computing device, a first amount of tokens based on:
    a pooled amount of tokens associated with the number of CPU cores associated with the computing device, and
    a currently used amount of tokens, the currently used amount of tokens being associated with a number of other transcoding requests being processed by the computing device;
  determining, by the computing device, a second amount of tokens associated with transcoding the content based on at least one of a size of the content, a type of the content, a resolution of the content, and a frame rate of the content; and
  when the first amount of tokens is less than the second amount of tokens:
    bypassing transcoding for the content, or
    adjusting a transcoding parameter to reduce a number of tokens associated with transcoding the content, wherein the reduced number of tokens is less than the first amount of tokens.

2. The computerized method of claim 1, further comprising adjusting, by the computing device, the pooled amount of tokens based on at least one of:
   a level of CPU usage associated with the computing device; and
   an amount of available channel bandwidth.

3. The computerized method of claim 1, wherein the currently used amount of tokens ranges from zero tokens to the pooled amount of tokens.

4. The computerized method of claim 1, wherein determining the first amount of tokens further comprises subtracting the currently used amount of tokens from the pooled amount of tokens.

5. The computerized method of claim 1, further comprising transcoding the requested content when the first amount of tokens is greater than or equal to the second amount of tokens.

6. The computerized method of claim 1, wherein the type of the content comprises at least one of image, audio, text, and video.

7. The computerized method of claim 1, wherein adjusting the transcoding parameter comprises reducing an amount of transcoding applied to the content.

8. A computing system of adaptively transcoding media in a communications network such that computer processing resources are effectively utilized to deal with varying traffic patterns in the communications network, the computing system comprising:
   a processor;
   a memory coupled to the processor and including instructions that, when executed by the processor, cause the processor to:
      receive a request to transcode content for delivery from a content provider to an end user device;
      determine a number of CPU cores associated with the computing system based on at least one of a number of virtual machines and a number of containers provisioned to transcode the content;
      determine a first amount of tokens based on:
         a pooled amount of tokens associated with the number of CPU cores associated with the computing system, and
         a currently used amount of tokens, the currently used amount of tokens being associated with a number of other transcoding requests being processed by the computing system; and
      determine a second amount of tokens associated with transcoding the content based on at least one of a size of the content, a type of the content, a resolution of the content, and a frame rate of the content;
      when the first amount of tokens is less than the second amount of tokens: bypass transcoding for the content, or adjust a transcoding parameter to reduce a number of tokens associated with transcoding the content, wherein the reduced number of tokens is less than the first amount of tokens.

9. The computing system of claim 8, wherein the processor is further caused to adjust the pooled amount of tokens based on at least one of:
   a level of CPU usage associated with the computing system; and
   an amount of available channel bandwidth.

10. The computing system of claim 8, wherein the currently used amount of tokens ranges from zero tokens to the pooled amount of tokens.

11. The computing system of claim 8, wherein to determine the first amount of tokens, the processor is further caused to subtract the currently used amount of tokens from the pooled amount of tokens.

12. The computing system of claim 8, wherein the processor is further caused to transcode the requested content when the first amount of tokens is greater than or equal to the second amount of tokens.

13. The computing system of claim 8, wherein the type of the content comprises at least one of image, audio, text, and video.

14. The computing system of claim 8, wherein to adjust the transcoding parameter the processor is further caused to determine an amount of transcoding applied to the content.

15. A non-transitory computer readable medium having executable instructions operable to cause an apparatus to:
   receive a request to transcode content for delivery from a content provider to an end user device;
   determine a number of CPU cores associated with a computing device based on at least one of a number of virtual machines and a number of containers provisioned to transcode the content;
   determine a first amount of tokens based on:
      a pooled amount of tokens associated with the number of CPU cores associated with the computing device, and
      a currently used amount of tokens, the currently used amount of tokens being associated with a number of other transcoding requests being processed by the computing device; and
   determine a second amount of tokens associated with transcoding the content based on at least one of a size of the content, a type of the content, a resolution of the content, and a frame rate of the content;
   when the first amount of tokens is less than the second amount of tokens: bypass transcoding for the content, or adjust a transcoding parameter to reduce a number of tokens associated with transcoding the content, when the reduced number of tokens is less than the first amount of tokens.

16. The non-transitory computer readable medium of claim 15, wherein the apparatus is further caused to adjust the pooled amount of tokens based on at least one of: a level of CPU usage associated with the computing device; and an amount of available channel bandwidth.

17. The non-transitory computer readable medium of claim 15, wherein the currently used amount of tokens ranges from zero tokens to the pooled amount of tokens.

18. The non-transitory computer readable medium of claim 15, wherein to determine the first amount of tokens, the apparatus is further caused to subtract the currently used amount of tokens from the pooled amount of tokens.

* * * * *